Feb. 7, 1950 C. B. DALE 2,496,382

TONE ARM MOUNTING

Filed April 1, 1947

Inventor
Colin B. Dale
by:
Benning & Benning
Attys.

Patented Feb. 7, 1950 2,496,382

UNITED STATES PATENT OFFICE 2,496,382

TONE ARM MOUNTING

Colin B. Dale, Barrington, Ill., assignor to Webster-Chicago Corporation, Chicago, Ill., a corporation of Illinois Application April 1, 1947, Serial No. 738,554

1 Claim. (Cl. 308—139)

This invention relates to record players for phonographs and the like, and is particularly concerned with the provision of an improved supporting means for the tone arm which carries the record-engaging stylus.

In a conventional tone arm mounting there is apt to be a certain amount of play between the vertical pivot shaft of the tone arm and the bearing or bearings for this shaft. When the tone arm vibrates sideways, the motion is transmitted to the vertical shaft and causes it to oscillate in its bearings, thus introducing a certain amount of noise and distortion into the reproduced sound.

An object of the invention is to improve the quality of the sound reproduction in a phonograph or like device by eliminating lateral movement of the vertical pivot shaft on which the tone arm is mounted.

A further object is to reduce the amount of play between the pivot shaft and its bearings by causing one end of the shaft to be continually cammed laterally so that the shaft is urged into a firm contact with its bearings.

A still further object is to provide an improved bearing for the vertical shaft having a substantially V-shaped slot instead of the usual round hole to accommodate the shaft.

The above and other objects, features and advantages of the invention will be apparent from the following specification when taken in connection with the accompanying drawing wherein certain preferred embodiments thereof are set forth for purposes of illustration.

In the drawing, wherein like reference numerals refer to like parts throughout:

Figures 2, 5:
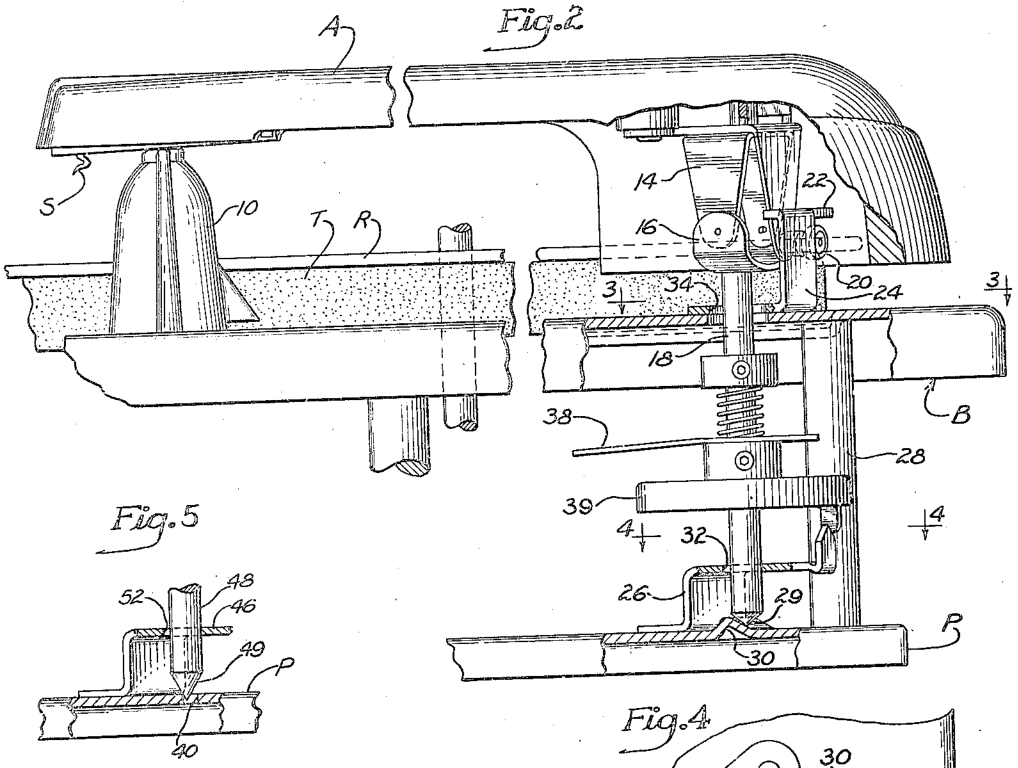
Fig. 2 is a fragmentary side elevational view of the record player, illustrating one embodiment of a tone arm mounting constructed in accordance with the principles of the invention.

Fig. 5, which is a fragmentary elevational view of the lower end portion of the tone arm shaft, shows a modified form of the invention.

Figure 1:
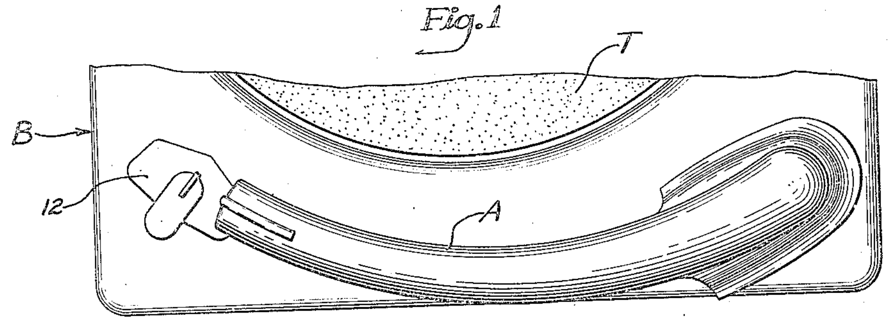
Fig. 1 is a fragmentary plan view of a record player, showing the tone arm thereof.

Referring to Figs. 1 and 2, the usual phonograph or record player comprises a base B, a turntable T and a tone arm A which is pivotally supported by the base B. A stylus S carried by the tone arm A near the free end thereof is adapted to ride in the groove of a record R supported by the turntable T. In Fig. 2 the tone arm A is shown in the raised position which it occupies prior to bringing the stylus S into contact with the record R. When the tone arm A is not in use, it may be rested upon a suitable support 10 provided on the base B at one side of the turntable T. A switch 12 (Fig. 1) controls the operation of the turntable T and of the automatic record changer, if the phonograph be so equipped.

The tone arm A is supported by a hinge 14 (Fig. 2) that is pivotally mounted on a yoke 16 secured to the upper end of a vertical pivot shaft 18. The hinge 14 permits a certain amount of pivotal movement of the tone arm A about a horizontal axis. Downward pivotal movement of the tone arm A is limited by engagement of a roller 20 connected to the hinge bracket 14 with a horizontally extending flange 22 on a bearing bracket 24 that is secured to the base B. The vertical shaft 18 is journaled in the bearing bracket 24 and also in another bearing bracket 26 mounted on a sub-base plate P that is secured to posts 28 which depend from the base plate B. The pivot shaft 18 permits horizontal angular movement of the tone arm A so that the stylus S may travel across the record R and be returned to its starting position.

The lower end of the shaft 18 is supported by the sub-base plate P. In accordance with the embodiment of the invention illustrated in Fig. 2, the lower end 29 of this shaft tapers conically to a point which rests on an inclined surface afforded by a bump or protuberance 30 on the sub-base plate P. This causes the bottom portion of the shaft 18 to be cammed sideways, or to the right as viewed in Fig. 2. Consequently, the shaft 18 is pressed firmly against one side edge of an aperture 32 in the bearing 26 through which the shaft 18 extends, as indicated in Fig. 2. The upper portion of the shaft 18 extends also through an aperture 34 in the bracket 24. Preferably, the aperture 34 has substantially straight side edges 36 which converge toward the left (see Fig. 3) to afford a substantially V-shaped opening.

Figure 3:
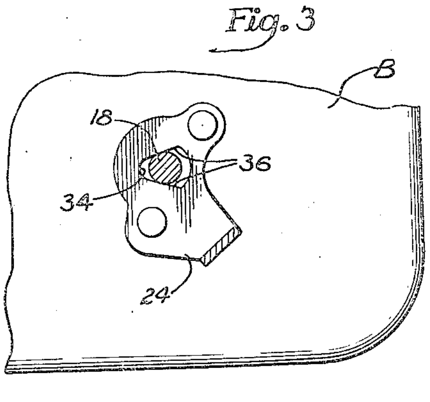
Fig. 3 is a fragmentary horizontal section, taken on line 3—3 in Fig. 2.
Figure 4:
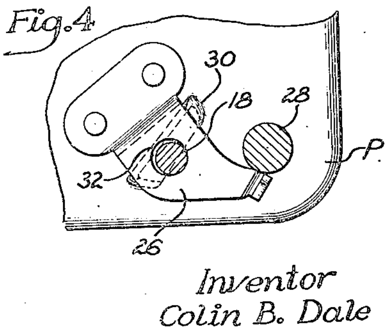
Fig. 4 is a horizontal section taken on line 4—4 in Fig. 2.

As the conical bottom 29 of the shaft 18 is cammed toward the right (Fig. 2) by the bump 30, the portion of the shaft above the bearing 26 (which serves as a fulcrum) is moved to the left as viewed in this figure, thus causing the shaft 18 to be lightly but firmly wedged in the aperture 34 in the bearing 24 as illustrated in Fig. 3. This effect is augmented by the drag of the stylus S on the record R, which tends to pull the shaft 18 to the left. This camming and wedging action upon the shaft 18 takes up the clearance in the bearings and so is effective to eliminate any tendency of the shaft to wiggle or oscillate sideways during tracking of the stylus S in a groove in the record R. As a result of eliminating bearing play in this fashion, objectionable noises incident to operation of the phonograph are obviated, and performance of the instrument is materially improved. In addition to supporting the tone arm A, the pivot shaft 18 may also support other devices such as an arm 38 and collar 39 forming part of a standard record changer mechanism.

The foregoing results obviously may be obtained in other ways, as for example, by providing the sub-base plate P with a depression in lieu of the bump 30 to afford an inclined surface on which the lower pointed end 29 of the shaft 18 rests. Still another modification is partially illustrated in Fig. 5. As there shown, the sub-base plate P has an aperture or recess 40 therein, and the tapered end 49 of the shaft 48 extends partially into this aperture. The camming action of the edge of the aperture 40 which engages the conical end portion 49 of the shaft 48, urges the shaft laterally against a lateral edge of the aperture 52 in the bearing 46. The upper end of the shaft 48 then is urged in the opposite direction to take up the clearance in an upper bearing the same as previously described.

It is apparent that I have provided a tone arm mounting which attains the objects of this invention. Various changes may be made in the specific embodiments set forth for purposes of illustration without departing from the principles of the invention. Accordingly, the invention is not to be limited to the precise details disclosed herein, but includes all modifications thereof within the scope of the appended claim.

I claim:

A phonographic tone arm mounting comprising a vertically extending pivot shaft, a bearing member embracing said shaft, said bearing member being provided with an aperture having converging, substantially straight edge portions adapted to cooperate with said shaft, a fulcrum member disposed to cooperate with said shaft and located between the ends of the same, and a support member disposed at the lower end of said shaft, said support member and the lower end of said shaft being formed respectively with interengaging camming means arranged to urge said shaft laterally against said fulcrum member to maintain said shaft in contact with said converging edge portions of said bearing member.

COLIN B. DALE.

REFERENCES CITED

The following references are of record in the file of this patent:

UNITED STATES PATENTS

| Number | Name | Date |
|---|---|---|
| 392,732 | Hutchinson | Nov. 13, 1888 |
| 2,003,316 | Schein | June 4, 1935 |
| 2,060,117 | Proctor | Nov. 10, 1936 |
| 2,357,034 | Thompson et al. | Aug. 29, 1944 |
| 2,402,150 | Dale | June 18, 1946 |

FOREIGN PATENTS

| Number | Country | Date |
|---|---|---|
| 431,544 | Great Britain | July 10, 1935 |